(12) United States Patent
Sago et al.

(10) Patent No.: US 6,921,429 B2
(45) Date of Patent: Jul. 26, 2005

(54) WATER BASE INK FOR INK-JET RECORDING

(75) Inventors: Hiromitsu Sago, Tokai (JP); Narumi Koga, Nagoya (JP); Kazuma Goto, Nagoya (JP); Hideo Ohira, Tajimi (JP); Masaya Fujioka, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 75 days.

(21) Appl. No.: 10/385,511

(22) Filed: Mar. 12, 2003

(65) Prior Publication Data

US 2003/0174193 A1 Sep. 18, 2003

(30) Foreign Application Priority Data

Mar. 13, 2002 (JP) ...................................... 2002-069293
Sep. 13, 2002 (JP) ...................................... 2002-268940

(51) Int. Cl.$^7$ ........................ C09D 11/00; C09D 11/02; B41J 2/01
(52) U.S. Cl. ............................... 106/31.43; 106/31.58; 106/31.75; 106/31.86; 347/100
(58) Field of Search ........................ 106/31.48, 31.58, 106/31.75, 31.86, 31.43; 347/100

(56) References Cited

U.S. PATENT DOCUMENTS

| 5,281,262 | A |   | 1/1994  | Saito ........................ 106/31.86 |
| 5,451,251 | A | * | 9/1995  | Mafune et al. .......... 106/31.48 |
| 5,749,951 | A | * | 5/1998  | Yoshiike et al. ......... 106/31.27 |
| 5,750,592 | A | * | 5/1998  | Shinozuka et al. ......... 523/161 |
| 5,769,930 | A | * | 6/1998  | Sano et al. ............... 106/31.36 |
| 5,897,695 | A | * | 4/1999  | Mayo et al. .............. 106/31.75 |
| 6,648,463 | B2 | * | 11/2003 | Koga et al. .................. 347/100 |
| 6,695,898 | B2 | * | 2/2004  | Momose ................... 106/31.43 |
| 6,695,900 | B2 | * | 2/2004  | Momose ................... 106/31.75 |
| 6,726,758 | B2 | * | 4/2004  | Sano ......................... 106/31.6 |
| 6,758,889 | B2 | * | 7/2004  | Koga et al. ............... 106/31.43 |
| 2003/0196569 | A1 | * | 10/2003 | Yatake et al. ............. 106/31.58 |

FOREIGN PATENT DOCUMENTS

| JP | 55-66977    | * | 5/1980  |
| JP | 55-066976   | * | 5/1980  |
| JP | 55-669887   | * | 5/1980  |
| JP | A 8-259864  |   | 10/1996 |
| JP | A 2001-226617 |  | 8/2001  |

OTHER PUBLICATIONS

Derwent abstract of JO55–066977; May 1980.*
Derwent abstract of JP55–0066976; May 1980.*
McCutcheon's Detergents & Emulsifiers; 1972 Annual; pp. 87, 134 and 176; Feb. 1972.*

* cited by examiner

*Primary Examiner*—Helene Klemanski
(74) *Attorney, Agent, or Firm*—Oliff & Berridge PLC

(57) ABSTRACT

A water base ink for ink-jet recording contains an amine compound selected from the group consisting of N-n-butylethanolamine, 1,4-bis(3-aminopropyl)piperazine, benzylamine, and an amine compound represented by a specified structural formula, a surfactant having a specified structural formula, a coloring agent, and water. It is possible to obtain a satisfactory rub resistance and a high printing quality with a sharp outline without causing any feathering on a recorded image. Further, it is possible to obtain a long term nozzle discharge stability by suppressing any corrosion on a metal member of a discharge head unit of an ink-jet recording apparatus.

13 Claims, 3 Drawing Sheets

WATER BASE INK FOR INK-JET RECORDING

BACKGROUND OF THE INVENTION

1. Field of the Invention

The present invention relates to a water base ink for ink-jet recording to be used for an ink-jet recording apparatus and an ink-jet recording apparatus which accommodates the same.

2. Related Art

In the ink-jet recording system, ink droplets are formed by using an ink discharge method including, for example, the electrostatic attraction method, the method in which mechanical vibration or displacement is applied to the ink by using a piezoelectric element, and the method in which bubbles are generated by heating the ink to utilize the pressure generated thereby, and all or a part of the ink droplets are adhered to an objective recording material such as paper to perform the recording.

Those known as the ink for ink-jet recording to be used for the ink-jet recording system as described above include those obtained by dissolving or dispersing a water-soluble dye or a pigment in a liquid medium composed of water and a water-soluble organic solvent. The ink for ink-jet recording as described above is required to have the optimum performance characteristics to be used for the ink-jet recording method. Specifically, for example, the following features are required. That is, when an image is formed on the recording paper, a high printing quality is obtained with a sharp outline or contour of the image without causing any irregular flow of the ink along the fibers of the recording paper or any irregular permeation of the ink into the spaces between the fibers (hereinafter referred to as "feathering" as well). When an image is formed on the recording paper, then the ink is quickly dried, and the rub resistance (property which allows the image to be not disturbed when the paper having the image formed with the ink is rubbed) is satisfactory. No corrosion is caused on metal material and resin material which are used for the ink-jet head, and it is possible to perform stable jetting operation for a long period of time without causing any clog-up at the nozzle.

Many techniques have been hitherto used in order to satisfy the performance characteristics as described above. Japanese Patent Application Laid-open No. 8-259864 discloses a technique in which the permeability of an ink is suppressed on the recording paper surface by increasing the surface tension of the ink to obtain a high printing quality in which the feathering is scarcely caused. However, the following problem has arisen due to the slow permeation of the ink into the recording paper. That is, the drying performance is deteriorated and the rub resistance is deteriorated. On the other hand, Japanese Patent Application Laid-open No. 2001-226617 discloses a technique in which the permeability of an ink is improved to obtain the quick drying performance while maintaining a high printing quality in which the feathering is scarcely caused by using a surfactant having unsaturated bond and a surfactant having secondary or tertiary alkyl group in combination.

The discharge head of the ink-jet printer, which is based on the use of the piezoelectric element, has such a structure that the metal member makes direct contact with the ink in many cases. In particular, when the water base ink is used, the following problem has arisen. That is, the metal member is corroded by the water base ink to consequently cause the discharge failure and the clog-up at the filter and the nozzle in some cases.

However, it has been difficult for the conventional ink to satisfy all characteristics of the high printing quality with less feathering, the rub resistance of the recorded image, and the long term nozzle discharge stability brought about by the suppression of metal corrosion. The following situation has been sometimes caused. That is, the feathering occurs on the recorded image, the outline is not sharp, and the printing quality is deteriorated depending on the type of the added surfactant.

SUMMARY OF THE INVENTION

The present invention has been made in order to solve the problems involved in the conventional technique as described above, an object of which is to provide a water base ink for ink-jet recording which makes it possible to obtain a satisfactory rub resistance and a high printing quality with a sharp outline without causing any feathering on a recorded image and which makes it possible to obtain a long term nozzle discharge stability by suppressing any corrosion on a metal member of a discharge head unit of an ink-jet recording apparatus. Another object of the present invention is to provide an ink-jet recording apparatus which can maintain excellent discharge performance for long term.

According to the present invention, there is provided a water base ink for ink-jet recording comprising at least one amine compound selected from the following group (a), at least one surfactant selected from the following group (b), a coloring agent, and water. Group (a) is a group including an amine compound represented by the following general formula (1), N-n-butylethanolamine, 1,4-bis(3-aminopropyl)piperazine, and benzylamine.

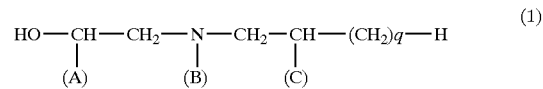

(1)

A side chain (A) represents hydrogen atom or methyl group, a side chain (B) represents a group containing hydroxyl group, a side chain (C) represents hydrogen atom or hydroxyl group, and q is an integer of not more than 5 in the general formula (1).

Group (b) is a group including a surfactant represented by the following general formula (2), a surfactant represented by the following general formula (3), and a surfactant represented by the following general formula (4).

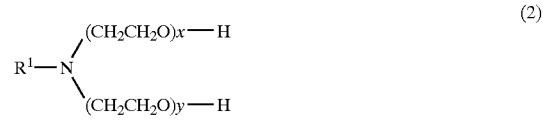

(2)

$R^1$ represents alkyl group and x and y are integers to satisfy x+y=5 to 15 in the general formula (2).

$$CH_3-(CH_2)_{11}-O-(CH_2CH_2O)z-H \quad (3)$$

z is an integer of not more than 9 in the general formula (3).

(4)

$R^2$ represents alkyl group in the general formula (4).

According to the present invention, there is provided an ink-jet recording apparatus comprising an ink-jet head which has an ink flow passage formed of a metal and which jets an ink; and an ink tank which accommodates the ink; wherein the ink includes the water base ink according to the present invention. When the water base ink according to the present invention is used for the recording apparatus such as an ink-jet printer provided with an ink-jet head in which the ink flow passage is formed of a metal, especially nickel or nickel alloy, the ink flow passage is effectively prevented from any corrosion. The recording apparatus may comprise a wiper which wipes the ink-jet head, and a purge unit which purges the ink-jet head. The ink tank may be an ink container fixedly provided in the apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
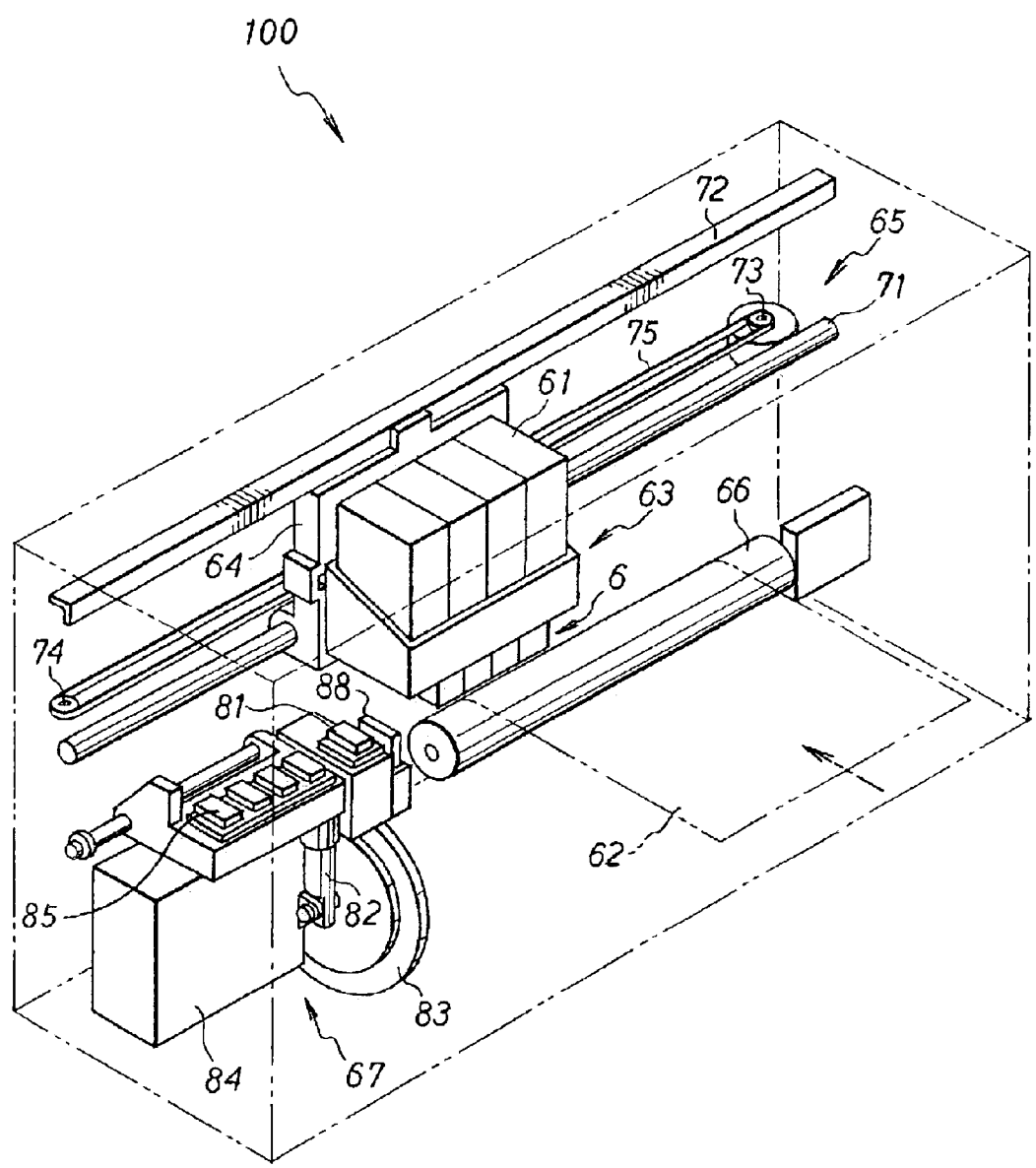
FIG. 1 is a perspective view showing a color ink-jet printer having an ink cartridge which contains ink prepared in examples of the invention.

The water base ink for ink-jet recording of the present invention contains at least one amine compound selected from the group consisting of the amine compound represented by the following general formula (1), N-n-butylethanolamine, 1,4-bis(3-aminopropyl)piperazine, and benzylamine.

The present inventors have previously found out the following fact. That is, when an amine compound such as alkanolamine is added to a water base ink for ink-jet recording, then the amine compound such as alkanolamine forms a dense coating on a metal surface thereby, and the coating functions as a protective film against the corrosion to suppress the corrosion on a metal member of a discharge head unit. The coating suppresses the clog-up at a nozzle and a filter of the discharge head, making it possible to perform a stable jetting operation for a long period of time. Those usable as alkanolamine include, for example, ethanolamine, diethanolamine, and triethanolamine. It has been found out that water base inks for ink-jet recording, in which the amine compound and a surfactant are used in combination, are insufficient in printing quality in relation to the feathering in many cases. However, the present inventors have found out the following fact. That is, the water base ink for ink-jet recording, which uses, in combination, the amine compound selected from the group consisting of N-n-butylethanolamine, 1,4-bis(3-aminopropyl)piperazine, benzylamine, and the amine compound represented by the general formula (1) and the specified surfactant as described later on, has the good rub resistance (effect principally achievable by containing the surfactant) and the effect to suppress the corrosion on the metal member composed of iron, nickel, or alloy containing iron or nickel (effect principally achievable by containing the amine compound), with which it is possible to obtain a high printing quality with a sharp outline without causing any feathering on a recorded image.

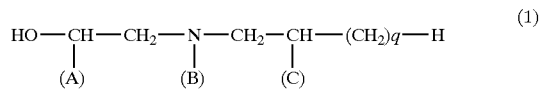

(1)

A side chain (A) represents hydrogen atom or methyl group, a side chain (B) represents a group containing hydroxyl group, a side chain (C) represents hydrogen atom or hydroxyl group, and q is an integer of not more than 5 in the general formula (1). When q is not more than 5, the solubility in the ink is satisfactory. When q is not more than 3, the solubility is more satisfactory.

The amine compound represented by the general formula (1) is not specifically limited, including, for example, tri-isopropanolamine and N-n-butyldiethanolamine.

In the amine compound represented by the general formula (1), it is preferable that the side chain (B) is hydroxyethyl group or 2-hydroxypropyl group, and q is an integer of not more than 3. The amine compound represented by the general formula (1), in which the side chain (B) is hydroxyethyl group or 2-hydroxypropyl group and q is an integer of not more than 3, is satisfactory in solubility in the water base ink for ink-jet recording of the present invention.

It is preferable that the content of the at least one amine compound selected from the group consisting of the amine compound represented by the general formula (1), N-n-butylethanolamine, 1,4-bis(3-aminopropyl)piperazine, and benzylamine in the water base ink for ink-jet recording of the present invention is 0.01 to 10% by weight with respect to the total amount of the water base ink for ink-jet recording of the present invention. If the content is less than 0.01% by weight, it is impossible to obtain any sufficient effect to suppress the corrosion on the metal member in some cases. If the content exceeds 10% by weight, the viscosity of the water base ink for ink-jet recording of the present invention is unnecessarily increased. Therefore, problems arise in some cases such that it is difficult to perform the discharge operation and the ink is dried extremely slowly on the recording paper. More preferably, the content is 0.1 to 3% by weight.

The water base ink for ink-jet recording of the present invention contains at least one surfactant selected from the group consisting of a surfactant represented by the following general formula (2), a surfactant represented by the following general formula (3), and a surfactant represented by the following general formula (4).

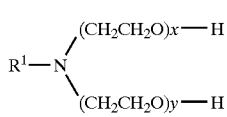

(2)

$R^1$ represents alkyl group and x and y are integers to satisfy x+y=5 to 15 in the general formula (2). When (x+y) is within the range described above, then an appropriate surface-active function is obtained, and it is possible to give necessary permeability to the ink.

The surfactant represented by the general formula (2) is not specifically limited, including, for example, polyoxyethylene alkylamine such as polyoxyethylene oleylamine and polyoxyethylene laurylamine. In general, the compound represented by the general formula (2) resides in substances contained in natural products such as coconut oil, beef tallow, and soybean oil. The compounds as represented by the general formula (2), which have alkyl groups having different numbers of carbon atoms and which have different values of (x+y), are present and distributed in a variety of ratios in the oils as described above. Therefore, it is convenient to use products derived from the oils and fats as described above. The products as described above include, for example, ETHOMEEN C/15 (x+y=5; numbers of carbon atoms of alkyl group: C8 to C18; main component has a number of carbon atoms of C12), ETHOMEEN C/20 (x+y=10; numbers of carbon atoms of alkyl group: C8 to C18; main component has a number of carbon atoms of C12), ETHOMEEN C/25 (x+y=15; numbers of carbon, atoms of alkyl group: C8 to C18; main component has a number of carbon atoms of C12), ETHOMEEN S/15 (x+y=5; numbers of carbon atoms of alkyl group: C16 to C18; main component has a number of carbon atoms of C18), ETHOMEEN S/20 (x+y=10; numbers of carbon atoms of alkyl group: C16 to C18; main component has a number of carbon atoms of C18), ETHOMEEN S/25 (x+y=15; numbers of carbon atoms of alkyl group: C16 to C18; main component has a number of carbon atoms of C18), ETHOMEEN T/15 (x+y=5; numbers of carbon atoms of alkyl group: C12 to C18; main component has a number of carbon atoms of C18), ETHOMEEN T/20 (x+y=10; numbers of carbon atoms of alkyl group: C12 to C18; main component has a number of carbon atoms of C18), and ETHOMEEN T/25 (x+y=15; numbers of carbon atoms of alkyl group: C12 to C18; main component has a number of carbon atoms of C18) (all produced by Lion Akzo Co., Ltd.). ETHOMEEN C/15, C/20, and C/25 are surfactants derived from coconut oil, ETHOMEEN S/15, S/20, and S/25 are surfactants derived from soybean oil, and ETHOMEEN T/15, T/20, and T/25 are surfactants derived from beef tallow.

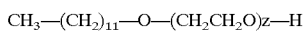

(3)

z is an integer of not more than 9 in the general formula (3). When z is not more than 9, then an appropriate surface-active function is obtained, and it is possible to give necessary permeability to the ink.

The surfactant represented by the general formula (3) is not specifically limited, including, for example, polyoxyethylene alkyl ether such as polyoxyethylene lauryl ether. In particular, those commercially available include, for example, EMULGEN 104P (z=4), EMULGEN 105 (z=5), EMULGEN 106 (z=5), and EMULGEN 108 (z=6) (all produced by Kao Corporation).

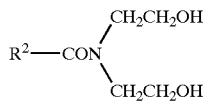

(4)

$R^2$ represents alkyl group in the general formula (4).

The surfactant represented by the general formula (4) is not specifically limited, including, for example, coconut oil fatty acid diethanolamide and lauryl acid diethanolamide. In particular, those commercially available include, for example, PROFAN EXTRA 24 and PROFAN EXTRA 128 EXTRA (both produced by Sanyo Chemical Industries, Ltd.).

It is preferable that the content of the at least one surfactant selected from the surfactant represented by the general formula (2), the surfactant represented by the general formula (3), and the surfactant represented by the general formula (4) in the water base ink for ink-jet recording of the present invention is 0.01 to 10% by weight with respect to the total amount of the water base ink for ink-jet recording of the present invention. If the content is less than 0.01% by weight, it is impossible to obtain any sufficient permeating function into the recording paper in some cases. If the content exceeds 10% by weight, it is difficult to maintain the discharge stability and the performance of introduction into the discharge head in relation to the surface tension in some cases. More preferably, the content is 0.1 to 3% by weight.

The water base ink for ink-jet recording of the present invention contains the coloring agent. Any one of the dye and the pigment can be used as the coloring agent. The dye is not specifically limited. For example, it is possible to preferably use direct dyes and acid dyes. Specifically, for example, it is possible to preferably use C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; and C. I. Acid Violet 49. The dye as described above may be used singly. Alternatively, two or more of the dyes as described above may be used in combination.

The content of the dye in the water base ink for ink-jet recording of the present invention is preferably 0.1 to 20% by weight, more preferably 0.3 to 15% by weight, and much more preferably 0.5 to 10% by weight with respect to the total amount of the water base ink for ink-jet recording of the present invention.

Any one of the inorganic pigment and the organic pigment can be used as the pigment. The pigment is not specifically limited. However, those preferably usable include, for example, carbon black, azo pigment, phthalocyanine pigment, anthraquinone pigment, quinacridone pigment, thioindigo pigment, triphenylmethane lake pigment, and oxazine lake pigment. Specifically, those having yellow colors include, for example, C. I. Pigment Yellow 1, 2, 3, 4, 5, 6, 7, 10, 11, 12, 13, 14, 15, 16, 17, 65, 74, and 83. Those having red colors include, for example, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123, and 163. Those having blue colors include, for example, C. I. Pigment Blue 2, 3, 15, 16, 22, and 25. Those having black colors include, for example, C. I. Pigment Black 1 and 7.

Those capable of self dispersion, which are subjected to the surface-modifying treatment and which can be stably dispersed even when no dispersing agent is used, are preferred as the pigment. In the case of the pigment which requires any dispersing agent, the balance of permeability of the ink into the recording paper may be destroyed depending on. the dispersing agent to be used, and the printing quality may be deteriorated in some cases. The surface modification is performed as follows. That is, the hydrophilic functional group such as carboxyl group, carbonyl group, and hydroxyl group or the salt thereof is bonded to the surface of the pigment directly or by the aid of, for example, alkyl group, alkyl ether group, or aryl group. Specifically, for example, there may be exemplified a method in which the hydrophilic functional group is introduced by means of a chemical treatment for oxidizing the pigment surface with an oxidizing agent in water, and a method in which the hydrophilic functional group or an active species containing the hydrophilic functional group is grafted on the pigment surface.

The pigment capable of self dispersion is not specifically limited. However, those preferably usable as the carbon black of those commercially available include, for example, CAB-O-JET 200, CAB-O-JET 300 (both produced by Cabot), and Bonjet Black CW1 (produced by Orient Chemical Industries, Ltd.).

The content of the pigment in the water base ink for ink-jet recording of the present invention, which is represented as the solid content, is preferably 1 to 20% by weight with respect to the total amount of the water base ink for ink-jet recording of the present invention. Within this range, it is possible to obtain a sufficient printing density.

The water base ink for ink-jet recording of the present invention contains water. It is preferable to use deionized water (pure water) as the water. The content of water in the water base ink for ink-jet recording of the present invention is preferably not less than 40% by weight with respect to the total amount of the water base ink for ink-jet recording of the present invention. If the content is less than 40% by weight, the viscosity of the water base ink for ink-jet recording of the present invention, which is given during the ordinary state, cannot be maintained to be a low viscosity at which the jetting operation can be normally performed in some cases.

Further, if necessary, known water-soluble organic solvents, antiseptic/fungicidal agents, and other similar compounds may be added to the water base ink for ink-jet recording of the present invention. The water-soluble organic solvent is principally used in order to avoid the drying up and the occurrence of any deposition from the ink at the tip of the ink-jet head. As for the water-soluble organic solvent, it is preferable to use those which have low volatility, which have high dye-dissolving performance, and which do not inhibit the dispersion stability of pigment particles. Specifically, the water-soluble organic solvent is selected from materials having high moisture absorption. The water-soluble organic solvent may be exemplified, for example, by polyols such as glycerol, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, and pentaerythritol; lactams such as 2-pyrrolidone, N-methyl-2-pyrrolidone, and ε-caprolactam; urea compounds such as urea, thiourea, ethylene urea, and 1,3-dimethylimidazolidinone; and sugars such as maltitol, sorbitol, gluconolactone, and maltose. The water-soluble organic solvent as described above may be used singly. Alternatively, two or more of the water-soluble organic solvents as described above may be used in combination.

The content of the water-soluble organic solvent in the water base ink for ink-jet recording of the present invention is preferably 5 to 40% by weight with respect to the total amount of the water base ink for ink-jet recording of the present invention. If the content is less than 5% by weight, then the moistening function is insufficient, and problems including, for example, deposition and drying up may arise in some cases. If the content exceeds 40% by weight, the viscosity of the ink is unnecessarily increased. As a result, for example, problems may arise in some cases such that it is difficult to discharge the ink and the ink is dried extremely slowly on the recording paper. The content is more preferably 7 to 40% by weight and much more preferably 10 to 40% by weight.

The water base ink for ink-jet recording of the present invention is used for an ink-jet recording apparatus for forming an image on the paper surface by discharging fine and minute liquid droplets from pores. In particular, when the water base ink for ink-jet recording of the present invention is used for an ink-jet recording apparatus having a metal member composed of iron, nickel, or alloy containing iron or nickel in a supply passage for supplying the ink to a discharge head unit, it is possible to exhibit the effect to suppress any corrosion of the metal member.

The water base ink for ink-jet recording of the present invention contains at least one amine compound selected from the group consisting of the amine compound represented by the general formula (1), N-n-butylethanolamine, 1,4-bis(3-aminopropyl)piperazine, and benzylamine. Accordingly, it is possible to obtain the long term nozzle discharge stability by suppressing the corrosion of the metal member. The water base ink for ink-jet recording of the present invention further contains at least one surfactant selected from the surfactant represented by the general formula (2), the surfactant represented by the general formula (3), and the surfactant represented by the general formula (4). Accordingly, these compounds act as the permeating agent. Thus, it is possible to decrease the surface tension so that the good rub resistance is obtained while maintaining the high printing quality without causing any feathering. In the water base ink for ink-jet recording of the present invention, the amine compound having the specified structure described above and the surfactant having the specified structure are combined. Accordingly, it is possible to obtain the good rub resistance and the high printing quality with a sharp outline without causing any feathering on the recorded image. Further, it is possible to obtain the nozzle discharge stability for a long period of time by suppressing the corrosion on the metal member of the discharge head unit of the ink-jet recording apparatus.

EXAMPLES

The present invention will be explained in further detail below as exemplified by Examples. However, the present invention is not limited to only Examples.

Example 1

A coloring agent, i.e., 33.3 g of a pigment dispersion liquid of CAB-O-JET 300 (produced by Cabot, carbon black mill base, pigment content: 15% by weight), water-soluble organic solvents, i.e., 20 g of glycerol and 5 g of dipropylene glycol, a surfactant represented by the general formula (2), i.e., 0.2 g of ETHOMEEN C/15 (produced by Lion Akzo Co., Ltd., nonionic surfactant, x+y=5), and an amine compound represented by the general formula (1), i.e., 0.2 g of triisopropanolamine were mixed, to which ultrapure water was added so that the total amount was 100 g. The mixture liquid was agitated for 1 hour, followed by being filtrated with a membrane filter having a pore size of 5 $\mu$m to prepare a water base ink for ink-jet recording having a pigment content of 5% by weight.

Example 2

A water base ink for ink-jet recording having a pigment content of 5% by weight was prepared in the same manner as in Example 1 except that a coloring agent, i.e., a pigment dispersion liquid of Bonjet Black CW1 (produced by Orient Chemical Industries, Ltd., carbon black mill base, pigment content: 20% by weight) was used in place of the pigment dispersion liquid of CAB-O-JET 300 (produced by Cabot, carbon black mill base, pigment content: 15% by weight).

Example 3

A water base ink for ink-jet recording having a dye content of 2% by weight was prepared in the same manner as in Example 1 except that a coloring agent, i.e., C. I. Direct Red 227 was used in place of the pigment dispersion liquid of CAB-O-JET 300 (produced by Cabot, carbon black mill base, pigment content: 15% by weight).

Example 4

A water base ink for ink-jet recording having a dye content of 2% by weight was prepared in the same manner as in Example 1 except that a coloring agent, i.e., C. I. Direct Blue 199 was used in place of the pigment dispersion liquid of CAB-O-JET 300 (produced by Cabot, carbon black mill base, pigment content: 15% by weight).

Example 5

A water base ink for ink-jet recording having a pigment content of 5% by weight was prepared in the same manner as in Example 1 except that a surfactant represented by the general formula (2), i.e., ETHOMEEN S/15 (produced by Lion Akzo Co., Ltd., nonionic surfactant, x+y=5) was used in place of the surfactant represented by the general formula (2), i.e., ETHOMEEN C/15 (produced by Lion Akzo Co., Ltd., nonionic surfactant, x+y=5).

Example 6

A water base ink for ink-jet recording having a pigment content of 5% by weight was prepared in the same manner as in Example 5 except that a coloring agent, i.e., a pigment dispersion liquid of Bonjet Black CW1 (produced by Orient Chemical Industries, Ltd., carbon black mill base, pigment content: 20% by weight) was used in place of the pigment dispersion liquid of CAB-O-JET 300 (produced by Cabot, carbon black mill base, pigment content: 15% by weight).

Example 7

A water base ink for ink-jet recording having a pigment content of 5% by weight was prepared in the same manner as in Example 1 except that a surfactant represented by the general formula (3), i.e., EMULGEN 106 (produced by Kao Corporation, nonionic surfactant) was used in place of the surfactant represented by the general formula (2), i.e., ETHOMEEN C/15 (produced by Lion Akzo Co., Ltd., nonionic surfactant, x+y=5).

Example 8

A water base ink for ink-jet recording having a pigment content of 5% by weight was prepared in the same manner as in Example 7 except that a coloring agent, i.e., a pigment dispersion liquid of Bonjet Black CW1 (produced by Orient Chemical Industries, Ltd., carbon black mill base, pigment content: 20% by weight) was used in place of the pigment dispersion liquid of CAB-O-JET 300 (produced by Cabot, carbon black mill base, pigment content: 15% by weight).

Example 9

A water base ink for ink-jet recording having a pigment content of 5% by weight was prepared in the same manner as in Example 1 except that a surfactant represented by the general formula (4), i.e., PROFAN EXTRA 24 (produced by Sanyo Chemical Industries, Ltd., nonionic surfactant) was used in place of the surfactant represented by the general formula (2), i.e., ETHOMEEN C/15 (produced by Lion Akzo Co., Ltd., nonionic surfactant, x+y=5).

Example 10

A water base ink for ink-jet recording having a pigment content of 5% by weight was prepared in the same manner as in Example 9 except that a coloring agent, i.e., a pigment dispersion liquid of Bonjet Black CW1 (produced by Orient Chemical Industries, Ltd., carbon black mill base, pigment content: 20% by weight) was used in place of the pigment dispersion liquid of CAB-O-JET 300 (produced by Cabot, carbon black mill base, pigment content: 15% by weight).

Example 11

A water base ink for ink-jet recording having a pigment content of 5% by weight was prepared in the same manner as in Example 1 except that an amine compound represented by the general formula (1), i.e., N-n-butyldiethanolamine was used in place of the amine compound represented by the general formula (1), i.e., triisopropanolamine.

Example 12

A water base ink for ink-jet recording having a pigment content of 5% by weight was prepared in the same manner as in Example 11 except that a coloring agent, i.e., a pigment dispersion liquid of Bonjet Black CW1 (produced by Orient Chemical Industries, Ltd., carbon black mill base, pigment content: 20% by weight) was used in place of the pigment dispersion liquid of CAB-O-JET 300 (produced by Cabot, carbon black mill base, pigment content: 15% by weight).

Example 13

A water base ink for ink-jet recording having a pigment content of 5% by weight was prepared in the same manner as in Example 11 except that a surfactant represented by the general formula (3), i.e., EMULGEN 106 (produced by Kao Corporation, nonionic surfactant) was used in place of the surfactant represented by the general formula (2), i.e., ETH-OMEEN C/15 (produced by Lion Akzo Co., Ltd., nonionic surfactant, x+y=5).

Example 14

A water base ink for ink-jet recording-having a pigment content of 5% by weight was prepared in the same manner as in Example 13 except that a coloring agent, i.e., a pigment dispersion liquid of Bonjet Black CW1 (produced by Orient Chemical Industries, Ltd., carbon black mill base, pigment content: 20% by weight) was used in place of the pigment dispersion liquid of CAB-O-JET 300 (produced by Cabot, carbon black mill base, pigment content: 15% by weight).

Example 15

A water base ink for ink-jet recording having a pigment content of 5% by weight was prepared in the same manner as in Example 1 except that N-n-butyldiethanolamine was used in place of the amine compound represented by the general formula (1), i.e., triisopropanolamine.

Example 16

A water base ink for ink-jet recording having a pigment content of 5% by weight was prepared in the same manner as in Example 15 except that a surfactant represented by the general formula (3), i.e., EMULGEN 106 (produced by Kao Corporation, nonionic surfactant) was used in place of the surfactant represented by the general formula (2), i.e., ETH-OMEEN C/15 (produced by Lion Akzo Co., Ltd., nonionic surfactant, x+y=5).

Example 17

A water base ink for ink-jet recording having a pigment content of 5% by weight was prepared in the same manner as in Example 1 except that 1,4-bis(3-aminopropyl) piperazine was used in place of the amine compound represented by the general formula (1), i.e., triisopropanolamine.

Example 18

A water base ink for ink-jet recording having a pigment content of 5% by weight was prepared in the same manner as in Example 17 except that a surfactant represented by the general formula (3), i.e., EMULGEN 106 (produced by Kao Corporation, nonionic surfactant) was used in place of the surfactant represented by the general formula (2), i.e., ETH-OMEEN C/15 (produced by Lion Akzo Co., Ltd., nonionic surfactant, x+y=5).

Example 19

A water base ink for ink-jet recording having a pigment content of 5% by weight was prepared in the same manner as in Example 1 except that benzylamine was used in place of the amine compound represented by the general formula (1), i.e., triisopropanolamine.

Example 20

A water base ink for ink-jet recording having a pigment content of 5% by weight was prepared in the same manner as in Example 19 except that a surfactant represented by the general formula (3), i.e., EMULGEN 106 (produced by Kao Corporation, nonionic surfactant) was used in place of the surfactant represented by the general formula (2), i.e., ETH-OMEEN C/15 (produced by Lion Akzo Co., Ltd., nonionic surfactant, x+y=5).

Comparative Examples 1 to 4

Water base inks for ink-jet recording each having a pigment content of 5% by weight were prepared in the same manner as in Examples 1 to 4 except that an amine compound other than the amine compound represented by the general formula (1), i.e., triethanolamine was used in place of the amine compound represented by the general formula (1), i.e., triisopropanolamine. The prepared inks were designated as water base inks for ink-jet recording of Comparative Examples 1 to 4.

Comparative Examples 5 and 6

Water base inks for ink-jet recording each having a pigment content of 5% by weight were prepared in the same manner as in Examples 1 and 2 except that an amine compound other than the amine compound represented by the general formula (1), i.e., diethanolamine was used in place of the amine compound represented by the general formula (1), i.e., triisopropanolamine. The prepared inks were designated as water base inks for ink-jet recording of Comparative Examples 5 and 6.

Comparative Examples 7 and 8

Water base inks for ink-jet recording each having a pigment content of 5% by weight were prepared in the same manner as in Examples 1 and 2 except that an amine compound other than the amine compound represented by the general formula (1), i.e., N-ethyldiethanolamine was used in place of the amine compound represented by the general formula (1), i.e., triisopropanolamine. The prepared inks were designated as water base inks for ink-jet recording of Comparative Examples 7 and 8.

Comparative Examples 9 and 10

Water base inks for ink-jet recording each having a pigment content of 5% by weight were prepared in the same manner as in Examples 1 and 2 except that an amine compound other than the amine compound represented by the general formula (1), i.e., N-ethylmonoethanolamine was used in place of the amine compound represented by the general formula (1), i.e., triisopropanolamine. The prepared inks were designated as water base inks for ink-jet recording of Comparative Examples 9 and 10.

Comparative Examples 11 and 12

Water base inks for ink-jet recording each having a pigment content of 5% by weight were prepared in the same manner as in Examples 1 and 2 except that an amine compound other than the amine compound represented by the general formula (1), i.e., N-methylmonoethanolamine was used in place of the amine compound represented by the general formula (1), i.e., triisopropanolamine. The prepared inks were designated as water base inks for ink-jet recording of Comparative Examples 11 and 12.

Comparative Examples 13 and 14

Water base inks for ink-jet recording each having a pigment content of 5% by weight were prepared in the same manner as in Examples 1 and 2 except that a surfactant other than the surfactant represented by the general formula (2), the surfactant represented by the general formula (3), and the surfactant represented by the general formula (4), i.e., OLF-INE E1010 (produced by Nissin Chemical Industry Co., Ltd.) was used in place of the surfactant represented by the general formula (2), i.e., ETHOMEEN C/15 (produced by Lion Akzo Co., Ltd., nonionic surfactant, x+y=5). The prepared inks were designated as water base inks for ink-jet recording of Comparative Examples 13 and 14.

Comparative Examples 15 and 16

Water base inks for ink-jet recording each having a pigment content of 5% by weight were prepared in the same manner as in Examples 1 and 2 except that the amine compound represented by the general formula (1), i.e., triisopropanolamine was not used, but pure water was used in a larger amount equivalent thereto. The prepared inks were designated as water base inks for ink-jet recording of Comparative Examples 15 and 16.

Comparative Examples 17 and 18

Water base inks for ink-jet recording each having a pigment content of 5% by weight were prepared in the same manner as in Examples 1 and 2 except that the surfactant represented by the general formula (2), i.e., ETHOMEEN C/15 (produced by Lion Akzo Co., Ltd., nonionic surfactant, x+y=5) was not used, but pure water was used in a larger amount equivalent thereto. The prepared inks were designated as water base inks for ink-jet recording of Comparative Examples 17 and 18.

The compositions of the water base inks for ink-jet recording prepared in Examples 1 to 20 and Comparative Examples 1 to 18 are shown in Table 1.

TABLE 1

| | Coloring agent; Pigment blending amount: solid content 5% by weight; Dye blending amount: solid content 2% by weight | Surfactant; Blending amount: 0.2% by weight | Amine compound; Blending amount: 0.2% by weight |
|---|---|---|---|
| Example 1 | CAB-O-JET 300 | ETHOMEEN C/15 | triiso-propanolamine |
| Example 2 | Bonjet Black CW1 | ETHOMEEN C/15 | triiso-propanolamine |
| Example 3 | C. I. Direct Red 227 | ETHOMEEN C/15 | triiso-propanolamine |
| Example 4 | C. I. Direct Blue 199 | ETHOMEEN C/15 | triiso-propanolamine |
| Example 5 | CAB-O-JET 300 | ETHOMEEN S/15 | triiso-propanolamine |
| Example 6 | Bonjet Black CW1 | ETHOMEEN S/15 | triiso-propanolamine |
| Example 7 | CAB-O-JET 300 | EMULGEN 106 | triiso-propanolamine |
| Example 8 | Bonjet Black CW1 | EMULGEN 106 | triiso-propanolamine |
| Example 9 | CAB-O-JET 300 | PROFAN EXTRA 24 | triiso-propanolamine |
| Example 10 | Bonjet Black CW1 | PROFAN EXTRA 24 | triiso-propanolamine |
| Example 11 | CAB-O-JET 300 | ETHOMEEN C/15 | N-n-butyl-diethanolamine |
| Example 12 | Bonjet Black CW1 | ETHOMEEN C/15 | N-n-butyl-diethanolamine |
| Example 13 | CAB-O-JET 300 | EMULGEN 106 | N-n-butyl-diethanolamine |
| Example 14 | Bonjet Black CW1 | EMULGEN 106 | N-n-butyl-diethanolamine |
| Example 15 | CAB-O-JET 300 | ETHOMEEN C/15 | N-n-butyl-ethanolamine |
| Example 16 | CAB-O-JET 300 | EMULGEN 106 | N-n-butyl-ethanolamine |
| Example 17 | CAB-O-JET 300 | ETHOMEEN C/15 | 1,4-bis(3-aminopropyl)piperazine |
| Example 18 | CAB-O-JET 300 | EMULGEN 106 | 1,4-bis(3-aminopropyl)piperazine |
| Example 19 | CAB-O-JET 300 | ETHOMEEN C/15 | benzylamine |
| Example 20 | CAB-O-JET 300 | EMULGEN 106 | benzylamine |
| Comp. Ex. 1 | CAB-O-JET 300 | ETHOMEEN C/15 | triethanolamine |
| Comp. Ex. 2 | Bonjet Black CW1 | ETHOMEEN C/15 | triethanolamine |
| Comp. Ex. 3 | C. I. Direct Red 227 | ETHOMEEN C/15 | triethanolamine |
| Comp. Ex. 4 | C. I. Direct Blue 199 | ETHOMEEN C/15 | triethanolamine |
| Comp. Ex. 5 | CAB-O-JET 300 | ETHOMEEN C/15 | diethanolamine |
| Comp. Ex. 6 | Bonjet Black CW1 | ETHOMEEN C/15 | diethanolamine |
| Comp. Ex. 7 | CAB-O-JET 300 | ETHOMEEN C/15 | N-ethyl-diethanolamine |
| Comp. Ex. 8 | Bonjet Black CW1 | ETHOMEEN C/15 | N-ethyl-diethanolamine |
| Comp. Ex. 9 | CAB-O-JET 300 | ETHOMEEN C/15 | N-ethyl-monoethanol-amine |
| Comp. Ex. 10 | Bonjet Black CW1 | ETHOMEEN C/15 | N-ethylmono-ethanolamine |
| Comp. Ex. 11 | CAB-O-JET 300 | ETHOMEEN C/15 | N-methyl-monoethanol-amine |
| Comp. Ex. 12 | Bonjet Black CW1 | ETHOMEEN C/15 | N-methyl-monoethanol-amine |
| Comp. Ex. 13 | CAB-O-JET 300 | OLFINE E1010 | triiso-propanolamine |

TABLE 1-continued

| | Coloring agent; Pigment blending amount: solid content 5% by weight; Dye blending amount: solid content 2% by weight | Surfactant; Blending amount: 0.2% by weight | Amine compound; Blending amount: 0.2% by weight |
|---|---|---|---|
| Comp. Ex. 14 | Bonjet Black CW1 | OLFINE E1010 | triiso-propanolamine |
| Comp. Ex. 15 | CAB-O-JET 300 | ETHOMEEN C/15 | not added |
| Comp. Ex. 16 | Bonjet Black CW1 | ETHOMEEN C/15 | not added |
| Comp. Ex. 17 | CAB-O-JET 300 | not added | triiso-propanolamine |
| Comp. Ex. 18 | Bonjet Black CW1 | not added | triiso-propanolamine |

Glycerol: 20% by weight, dipropylene glycol: 5% by weight, pure water: balance.

EVALUATION

The water base inks for ink-jet recording prepared in Examples 1 to 20 and Comparative Examples 1 to 18 were evaluated for the feathering, the rub resistance, the discharge performance, and the metal corrosion.

Evaluation 1: Feathering

Alphanumeric letters were printed on XEROX 4200 paper with MFC-3100C (produced by Brother Industries, Ltd.) by using the water base ink for ink-jet recording. After being left to stand for not less than 1 hour after the printing, the sharpness of the letters and the feathering generated from the letters were observed under a microscope and with naked eyes. The influence exerted thereby on the image was visually judged to make the evaluation in accordance with the following criteria. ++: the letters are sharp and little feathering is observed. +: the letters are sharp, the feathering is slightly observed, but the feathering is not conspicuous. ±: the letters are not sharp, the feathering is somewhat conspicuous, and there is any practical problem. −: the letters are not sharp, the feathering is clearly conspicuous, and the printed matter cannot be directed to the practical use.

Evaluation 2: Rub Resistance

Alphanumeric letters were printed on XEROX 4200 paper with MFC-3100C (produced by Brother Industries, Ltd.) by using the water base ink for ink-jet recording. An identical blank sheet of paper was superimposed on the printed matter after a certain elapse of time of being left to stand after the printing. A flat weight of 100 g was placed thereon, and the printed matter was quickly extracted. The elapse of time of being left to stand, which was required until the printed portion of the printed matter after the extraction was not dirty, was measured to make the evaluation in accordance with the following criteria. +: within 15 seconds, −: not less than 16 seconds.

Evaluation 3: Discharge Performance

Printing was performed with MFC-3100C (produced by Brother Industries, Ltd.) by using the water base ink for ink-jet recording to confirm the discharge stability and confirm the discharge response. When the discharge stability was confirmed, the discharge was performed continuously for 24 hours at respective atmospheric temperatures of 5° C., 20° C., and 40° C. respectively. When the discharge response was confirmed, the following operation was performed. That is, the intermittent discharge for 1 minute was performed 100 times, and the discharge was performed arbitrarily, after which the system was left to stand for 2 months to confirm whether or not the discharge was performed successfully again. A case, in which the jetting operation was satisfactory in both of the confirmation of the discharge stability and the confirmation of the discharge response and the printing operation was successfully performed without causing any clog-up at the tip of the ink-jet head, was designated as "+". The other cases were designated as "−".

Evaluation 4: Metal Corrosion

A metal piece, which was composed of alloy of iron and nickel to be used for a raw material for the metal member in the ink supply passage, was immersed in the water base ink for ink-jet recording, followed by being left to stand at 60° C. for 2 weeks. The surface of the metal piece was visually observed before and after the operation of being left to stand to make the evaluation in accordance with the following criteria about the degree of progress of the corrosion caused by the immersion in the ink. +: no corrosion occurs on the surface of the metal piece, or only slight discoloration occurs. −: corrosion occurs on the surface of the metal piece.

Results of Evaluations 1 to 4 are shown in Table 2.

TABLE 2

| | Feathering | Rub resistance | Discharge performance | Metal corrosion |
|---|---|---|---|---|
| Example 1 | ++ | + | + | + |
| Example 2 | ++ | + | + | + |
| Example 3 | + | + | + | + |
| Example 4 | + | + | + | + |
| Example 5 | ++ | + | + | + |
| Example 6 | ++ | + | + | + |
| Example 7 | ++ | + | + | + |
| Example 8 | ++ | + | + | + |
| Example 9 | ++ | + | + | + |
| Example 10 | ++ | + | + | + |
| Example 11 | ++ | + | + | + |
| Example 12 | ++ | + | + | + |
| Example 13 | ++ | + | + | + |
| Example 14 | ++ | + | + | + |
| Example 15 | ++ | + | + | + |
| Example 16 | ++ | + | + | + |
| Example 17 | ++ | + | + | + |
| Example 18 | ++ | + | + | + |
| Example 19 | ++ | + | + | + |
| Example 20 | ++ | + | + | + |
| Comp. Ex. 1 | − | + | + | + |
| Comp. Ex. 2 | − | + | + | + |
| Comp. Ex. 3 | − | + | + | + |
| Comp. Ex. 4 | − | + | + | + |
| Comp. Ex. 5 | − | + | + | + |
| Comp. Ex. 6 | − | + | + | + |
| Comp. Ex. 7 | ± | + | + | + |
| Comp. Ex. 8 | ± | + | + | + |
| Comp. Ex. 9 | ± | + | + | + |
| Comp. Ex. 10 | ± | + | + | + |
| Comp. Ex. 11 | − | + | + | + |
| Comp. Ex. 12 | − | + | + | + |

TABLE 2-continued

| | Feathering | Rub resistance | Discharge performance | Metal corrosion |
|---|---|---|---|---|
| Comp. Ex. 13 | − | + | − | − |
| Comp. Ex. 14 | − | + | − | − |
| Comp. Ex. 15 | + | + | − | − |
| Comp. Ex. 16 | + | + | − | − |
| Comp. Ex. 17 | + | − | + | + |
| Comp. Ex. 18 | + | − | + | + |

As shown in Table 2, when the water base inks for ink-jet recording prepared in Examples 1 to 20 were used, then the satisfactory printing quality, in which the letters were sharp without causing any feathering, was obtained, the rub resistance was satisfactory, the discharge performance was satisfactory without causing any clog-up at the tip of the ink-jet head, and the metal corrosion was low. On the other hand, the water base inks for ink-jet recording prepared in Comparative Examples 1 to 18 involved any problem in any of the evaluations for the feathering, the rub resistance, the discharge stability, and the metal corrosion.

The ink of the present invention makes it possible to obtain a satisfactory rub resistance and a high printing quality with a sharp outline without causing any feathering on a recorded image. Further, the ink of the present invention makes it possible to obtain a long term nozzle discharge stability by suppressing any corrosion on a metal member of a discharge head unit of an ink-jet recording apparatus.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 2:
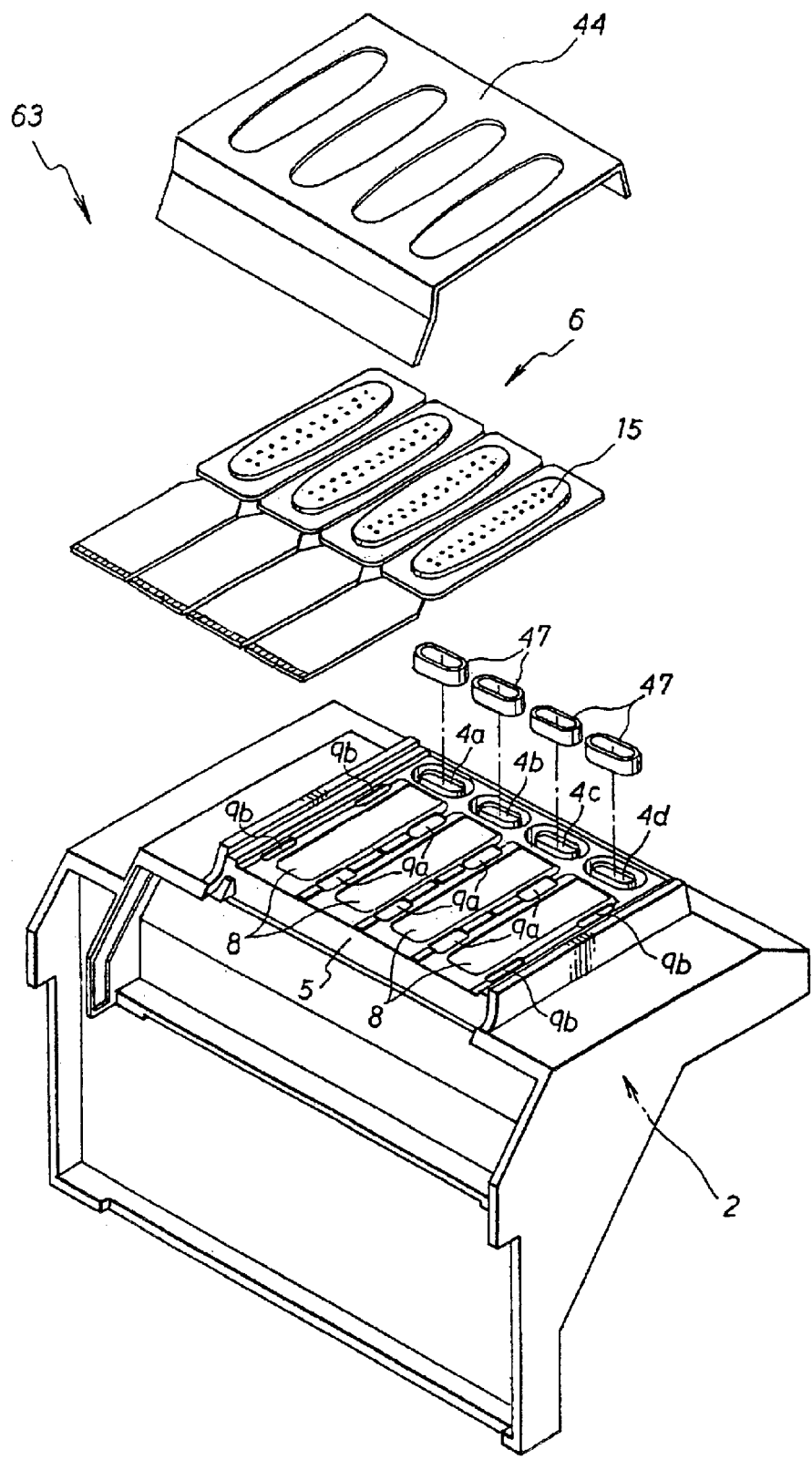
FIG. 2 is a perspective view of a head unit, with its nozzles facing upward.

As shown in FIG. 2, the head unit 63 is mounted on the carriage 64 (FIG. 1) that moves along the sheet 62 (FIG. 1) and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 (FIG. 1) are detachably attached from above. Ink supply paths 4a, 4b, 4c, 4d, each of which connects respective ink discharge portions of each ink cartridge 61 (FIG. 1). communicate with a bottom of a bottom plate 5 of the head unit 63. Each of the ink supply paths 4a, 4b, 4c, 4d is provided with a rubber packing 47 to intimately contact an ink supply hole 19a (FIG. 3).

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
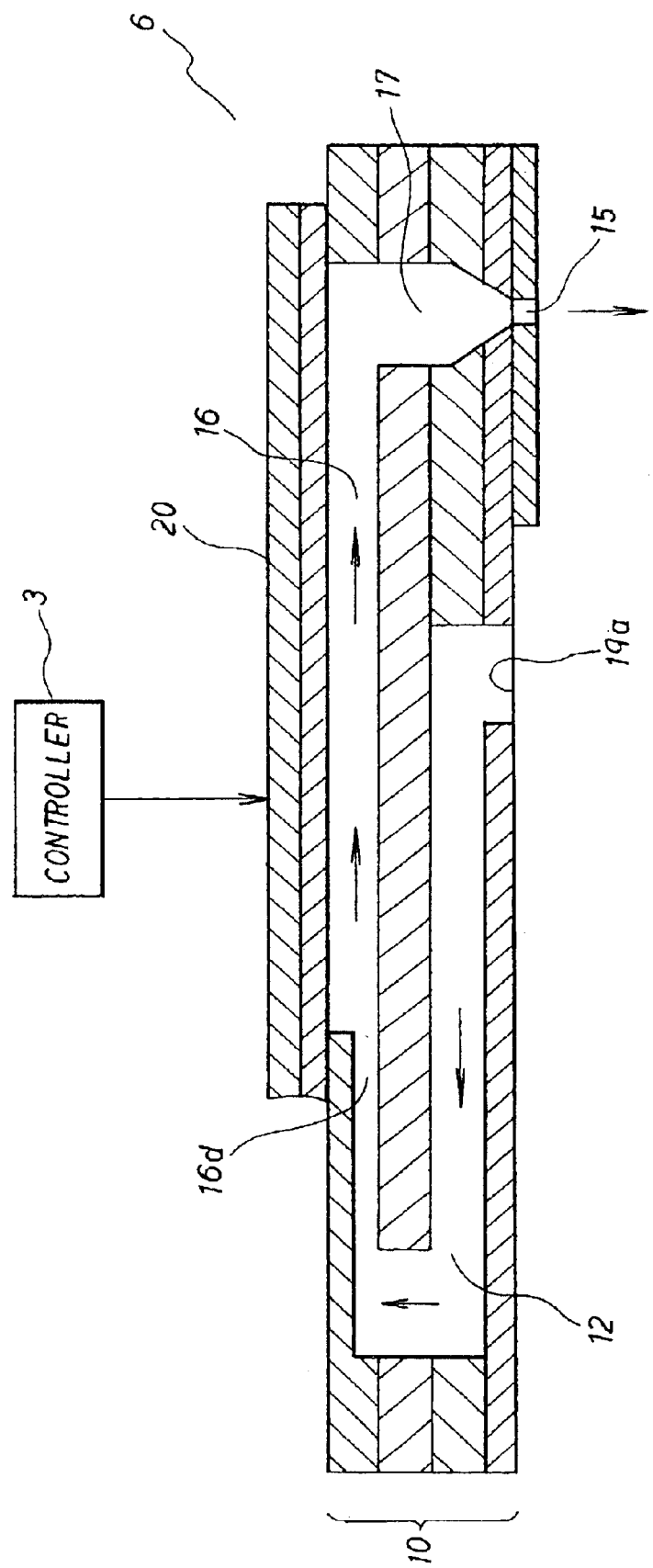
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 comprised of a plurality of thin metal plates which are formed of nickel or nickel alloy and the piezoelectric actuator 20. The cavity plate 10 has the ink supply holes 19a connected with the ink cartridge 61 (FIG. 1). the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 9a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head unit are also disclosed in these U.S. patents, a content of which has been incorporated herein by reference.

What is claimed is:

1. A water base ink for ink-jet recording comprising at least one amine compound selected from a group consisting of group (a), at least one surfactant selected from a group consisting of group (b), a coloring agent, and water:

group (a): N-n-butylethanolamine, 1,4-bis(3-aminopropyl)piperazine, beuzylamine, and an amine compound represented by the following general formula (1):

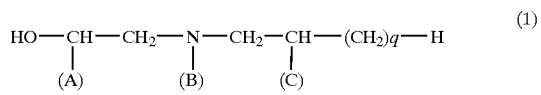

wherein a side chain (A) represents hydrogen atom or methyl group, a side chain (B) represents a group containing hydroxyl group, a side chain (C) represents hydrogen atom or hydroxyl group, and q is an integer of not more than 5 in the formula (1); and group (b): compounds represented by the following general formulas (2), (3), and (4):

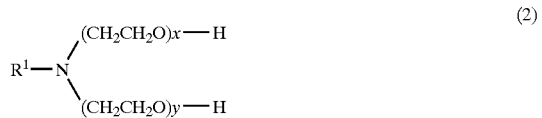

wherein $R^1$ represents alkyl group and x and y are integers to satisfy x+y=5 to 15 in the formula (2);

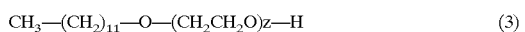

wherein z is an integer of not mare than 9 in the formula (3); and

wherein $R^2$ represents alkyl group in the formula (4).

2. The water base ink for ink-jet recording according to claim 1, wherein the side chain (B) is hydrcixyethyl group or 2-hydroxypropyl group, and q is an integer of not more than 3 in the amine compound represented by the general formula (1).

3. The water base ink for ink-jet recording according to claim 1, wherein the amine compound represented by the general formula (1) is triisopropanolamine or N-n-butyldiethanolamine.

4. The water base ink for ink-jet recording according to claim 1, wherein the surfactant is a mixture of the compounds represented by the general formula (2).

5. The water base ink for ink-jet recording according to claim 4, wherein the mixture is a mixture of polyoxyethylene alkylamines.

6. The water base ink for ink-jet recording according to claim 1, wherein the surfactant is the compound represented by the general formula (3).

7. The water base ink for ink-jet recording according to claim 6, wherein the compound represented by the general formula (3) is polyoxyethylene alkyl ether.

8. The water base ink for ink-jet recording according to claim 1, wherein the surfactant is the compound represented by the general formula (4).

9. The water base ink for ink-jet recording according to claim 8, wherein the compound represented by the general formula (4) is coconut oil fatty acid diethanolamide.

10. The water base ink for ink-jet recording according to claim 1, wherein the at least one amine compound selected from the group (a) is contained by 0.1 to 3% by weight with respect to a total amount of the water base ink.

11. The water base ink for ink-jet recording according to claim 1, wherein the at least one surfactant selected from the group (a) is contained by 0.01 to 10% by weight with respect to a total amount of the water base ink.

12. An ink-jet recording apparatus comprising:
an ink-jet head which has an ink flow passage formed of a metal and which jets an ink; and
an ink tank which accommodates the ink, wherein:
the ink includes the ink as defined in claim 1.

13. The ink-jet recording apparatus according to claim 12, wherein the metal is nickel or nickel alloy.

* * * * *